__# 2,909,440

PLASTIC PAVING COMPOSITION

Charles E. Cobb, Jacksonville, Fla., assignor of twenty percent to John A. Rush and five percent to George H. Hodges and Alexander Brest No Drawing. Application September 19, 1957
Serial No. 684,842

3 Claims. (Cl. 106—107)

This invention relates to plastic compositions for use in paving roadways, streets, sidewalks, etc., and particularly adapted for use in paving aircraft runways, taxiways and aprons.

Bitumen or asphalt products were commonly used as paving for aircraft runways until the development of aircraft engines which emitted high exhaust heats which rendered them impractical. Jet engines, for example, subject paving to tremendous heats which cause bitumen or asphalt to soften and thus become hazardous to use. These products are also subject to deterioration through the solvent actions of petroleum fuels and acids, and are unable to stand up, without channelizing, under high compressive and flexural stresses. It is well known that freezing and subsequent thawing will have deleterious results on paving of this type. For these reasons, all present day specifications for airport construction have deleted bitumens, asphalt, pitch and tar as paving materials.

The general object of the present invention is to provide a paving composition of the bitumen type which will not be subject to the adverse reactions mentioned above when used as a paving material in airport construction, thus adding greatly to the durability and lasting quality of runways, taxiways and aprons, while retaining the advantageous characteristics of the base material.

A more specific object of the invention is to provide an improved composition of such material that the bitumen, asphalt, tar, or pitch used therein will be rendered resistant to high temperatures, such as generated by jet propelled aircraft, without destroying the adhesive qualities of the bitumen, asphalt, tar or pitch.

Another object is the provision of such a composition wherein the bitumen, asphalt, tar or pitch is rendered highly resistant to the solvent actions of petroleum fuels and acids.

A further object is to provide a composition of this nature which is highly resistant to actions of freezing as well as to high heat and will not be adversely affected by sudden temperature changes even though the changes cover an unusually wide range.

A still further object is the provision of a composition having high compressive and flexural strength so that it will withstand heavy loads without breakdown.

Other objects of the invention will become apparent from the following description.

The plastic material forming the present invention is a composition which includes the following: (1) a well graded aggregate, which includes a coarse aggregate, which may consist of slag, limestone, granite or gravel, and a well graded fine aggregate, which may be sand, screenings, or a combination of these; (2) bitumen, asphalt, tar or pitch; (3) magnesia (calcined magnesite); and (4) aqueous magnesium chloride solution 20° to 25° Baumé. Throughout this application, the term bitumen will be used to indicate any of the commercially available products known as bitumen, asphalt, pitch or tar.

In preparing the above composition, the coarse and fine aggregates are first heated to a temperature of 325° to 350° Fahrenheit and, while maintained at this temperature, screened and graded into various sizes according to the specifications of the particular contract for which it is to be used. The proper amounts are then obtained by weighing, or proportioning by volume, and dumped into a mixer or pug mill. Bitumen of the character specified is then added to the aggregate. The material added must be previously heated to a temperature of 280° to 300° Fahrenheit, and the mass is mixed until all of the aggregates, both coarse and fine, are thoroughly coated. Aqueous magnesium chloride solution 22° Baumé which has been heated to a temperature of 250° Fahrenheit is then added to the mixture and thoroughly mixed with the other ingredients. As a last step, the magnesia (calcined magnesite) is added and thoroughly mixed. During the entire mixing process, the temperature is maintained at from 275° to 350° Fahrenheit. When the mixing is completed, it is necessary to use the product at once while it is still hot. It should not be used more than one hour after the final mixing.

The composition can be put upon a previously prepared base surface in any desired manner and then rolled, or compacted, in conventional fashion. It has been found that when compacted to 96% of the density of a laboratory specimen of the same composition which had been subjected to seventy-five blows of a standard Marshall hammer on each side, the resulting pavement has high compressive and flexural strength and is resistant to high temperature, the solvent actions of petroleum fuels, and adverse effects of freezing.

It is to be understood that due to the wide range of aggregates obtainable and usable in different localities, the proportions of the above ingredients will vary. It has been found, however, that good results can be obtained with the ingredients used in quantities within the following ranges:

|  | Percent by weight |
|---|---|
| Coarse and fine aggregates | 72 to 87 |
| Aqueous magnesium chloride solution 18° to 38° Baumé | 7 to 15 |
| Magnesia (calcined magnesite) | 2 to 15 |
| Bitumen, asphalt, tar or pitch (85° to 100° penetration) | 4 to 8.5 |

Numerous tests have been made of this composition, and the following is given as an example of a specific mix in order to illustrate the results obtainable. In this test, the coarse aggregate was granite screening and the fine aggregate was sand. The aggregate was in the following gradation as based on ASTM standard sieves:

| Size | ⅜" | #4 | #10 | #40 | #80 | #200 |
|---|---|---|---|---|---|---|
| Percent by Weight Passing | 100 | 99 | 81 | 65 | 42 | 8 |

|  | Percent by weight |
|---|---|
| Coarse and fine agg. of above gradation | 77 |
| Aqueous magnesium chloride solution 22° Baumé | 10.5 |
| Magnesia (calcined magnesite) | 7.0 |
| Bitumen 85°–100° penetration | 5.5 |

These ingredients were heated, graded and mixed in accordance with the process set out above and then compacted to proper density to obtain a standard Marshall test sample. This sample was then placed in a muffle furnace and subjected to the following temperatures for the times indicated. It is to be understood that the temperatures and times were consecutive and that the temperatures were raised as indicated during a continuous heating cycle.

|  | Minutes |
|---|---|
| 600° Fahrenheit | 20 |
| 700° Fahrenheit | 10 |
| 800° Fahrenheit | 10 |
| 900° Fahrenheit | 10 |
| 1000° Fahrenheit | 16 |
| 1100° Fahrenheit | 10 |

Thus the sample was subjected to seventy-six minutes of continuous heat ranging from 600° to 1100° Fahrenheit. An examination showed no deterioration or softening of the material. The sample was immediately placed in a deep freeze and held for a period of 72 hours at 40° Fahrenheit below zero. Upon removal from the deep freeze the samples were immediately placed in the muffle furnace at a temperature of 1000° Fahrenheit and held there for ten minutes. Careful examination disclosed no signs of deterioration in the sample. As a further test the sample was subjected to flame of an acetylene cutting torch at a temperature of 6300° Fahrenheit for two minutes. The only change in the specimen was the fusing of the aggregate at the point of contact of the flame.

Other samples were prepared using the same percentages of ingredients as given in the example above, and kept for a period of four days. These were then tested for compressive and flexural strength and found to have a compressive strength of 402 pounds per square inch.

Samples from this same mixture were tested by application of carbon tetra chloride, diesel fuel, J4 fuel, gasoline, hydrochloric and sulphuric acid.

These results are obtainable by reason of the reaction which takes place upon addition of the aqueous magnesium chloride solution and calcined magnesite to the composition which renders the bitumen resistant to heat and petroleum and acid products. The tests on the samples indicate conclusively that the material will withstand the heavy loads of airport use with a large safety factor without danger of channelizing, that the high temperatures to which airport runways, taxiways, etc. are now subjected will have no effect upon it, and it will resist the solvent action of petroleum fuels and acids normally encountered in airport use.

While the above set out proportions of the ingredients are believed to produce the best results, some modification is possible to meet various conditions without departing from the spirit and scope of the invention as defined by the appended claims.

What is claimed is:

1. A plastic composition for use as a paving material which consists essentially of the reaction product of a mixture of the following ingredients in the specified percentages by weight, coarse and fine aggregates 72% to 87%, bitumen 4% to 8.5%, aqueous magnesium chloride solution, 18° to 38° Baumé, 7% to 15%, and calcined magnesite 2% to 15%.

2. In a plastic composition as claimed in claim 1, the bitumen being 85° to 100° penetration.

3. A plastic composition for use as a paving material which consists essentially of the reaction product of a mixture of the following ingredients in the specified percentages by weight, coarse aggregate of granite screening of not larger than 3/8 inch and fine aggregate of sand combining to equal 77% of the mixture, bitumen, 85° to 100° penetration, 5.5%, aqueous magnesium chloride solution, 22° Baumé, 10.5%, and calcined magnesite 7%.

References Cited in the file of this patent

UNITED STATES PATENTS

| 480,591 | Keseling et al. | Aug. 9, 1892 |
| 1,379,053 | Sharpneck | May 24, 1921 |
| 2,152,798 | Fuller | Apr. 4, 1939 |

FOREIGN PATENTS

| 14,336 | Great Britain | 1892 |
| 15,147 | Great Britain | 1892 |
| 16,354 | Great Britain | 1892 |
| 4,907 | Great Britain | 1903 |
| 430,979 | Great Britain | June 28, 1935 |
| 496,952 | Great Britain | Dec. 8, 1938 |